United States Patent [19]
Nilsson

[11] Patent Number: 6,010,014
[45] Date of Patent: Jan. 4, 2000

[54] FILTER SECTOR

[76] Inventor: Harry Nilsson, Hauptstrasse 58, CH-8274 Tägerwilen, Switzerland

[21] Appl. No.: 09/155,259
[22] PCT Filed: Apr. 2, 1997
[86] PCT No.: PCT/SE97/00564
  § 371 Date: Sep. 23, 1998
  § 102(e) Date: Sep. 23, 1998
[87] PCT Pub. No.: WO97/36665
  PCT Pub. Date: Oct. 9, 1997

[30] Foreign Application Priority Data

Apr. 3, 1996 [SE] Sweden .................................. 9601300

[51] Int. Cl.[7] ....................................................... B01D 33/23
[52] U.S. Cl. ........................................... 210/486; 210/498
[58] Field of Search ..................... 210/346, 347, 210/483, 486, 487, 488, 494.4, 498

[56] References Cited

U.S. PATENT DOCUMENTS 2,781,133  2/1957  Thompson .
3,331,512  7/1967  Vore ....................................... 210/487
5,330,644  7/1994  Nilsson .

FOREIGN PATENT DOCUMENTS 30 33 423  4/1981  Germany .

*Primary Examiner*—Matthew O. Savage
*Attorney, Agent, or Firm*—Charles & Brady

[57] ABSTRACT

A filter sector for a filter disk of a rotating filter. The filter sector includes two interconnected plate shaped elements formed from a sheet material having a relatively thin thickness and each having planar portions defining a main plane. Protrusions shaped in the material of the plate shaped elements extend outwardly from the respective main plane and are adapted to keep a filter cloth at a distance from the respective main plane. Continuous, mutually spaced, parallel ridges are shaped in the material of the plate shaped elements and extend in a first direction over the filter sector. The protrusions extend in a second direction substantially perpendicular to the first direction and each protrusion is spanning over at least two adjacent ridges. Laterally adjacent protrusions are lengthwise displaced in relation to each other by at least the spacing between adjacent ridges. The ridges have a height over the main plane that is less than the distance, and the plate shaped elements are adjoined in the main plate planes.

8 Claims, 5 Drawing Sheets

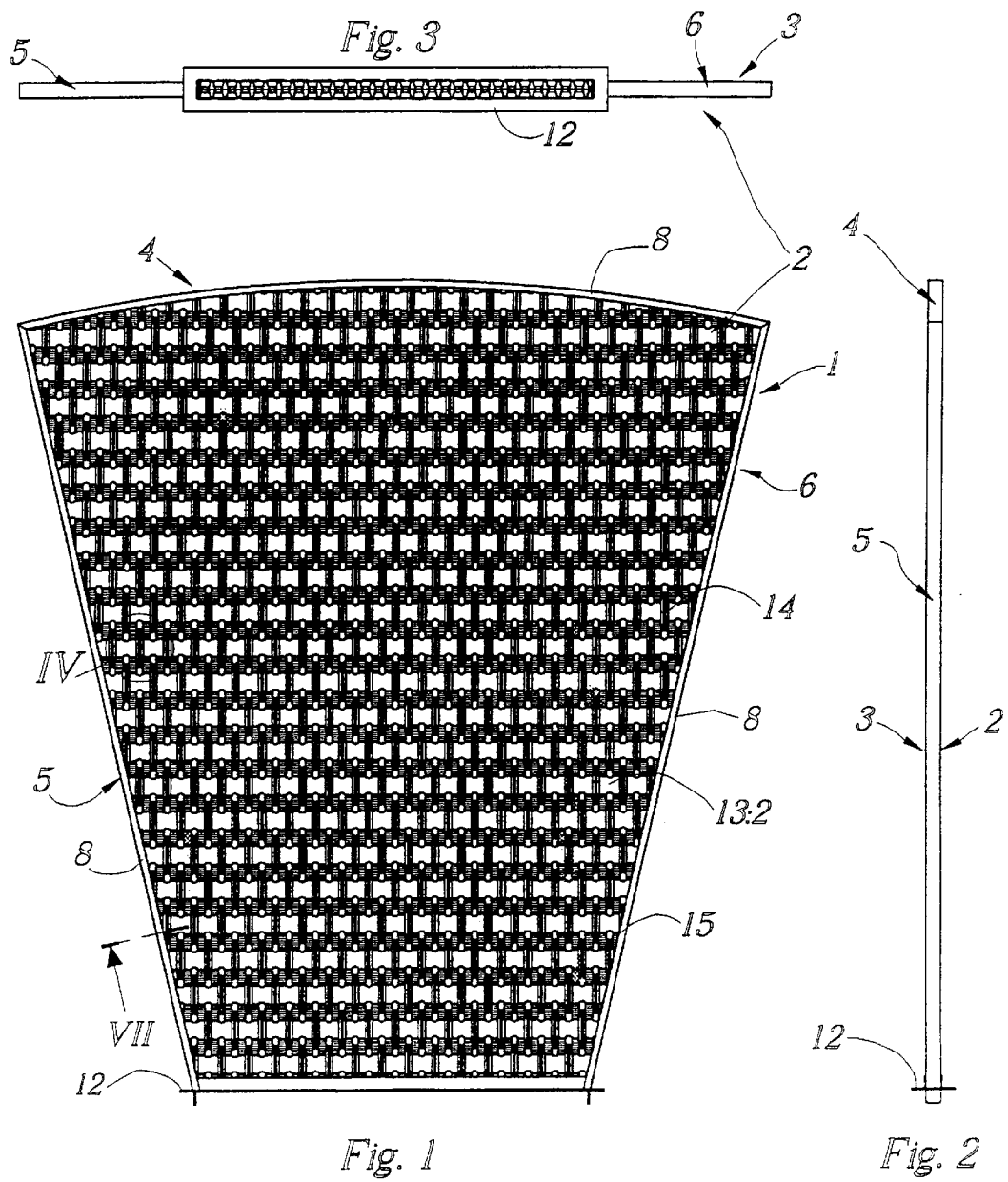

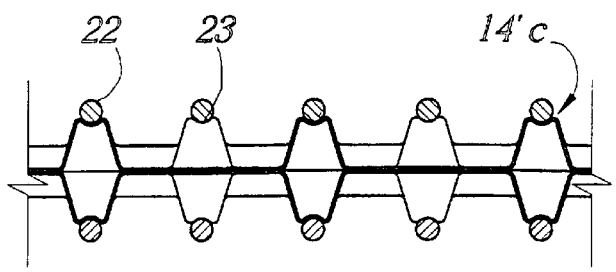
Fig. 12
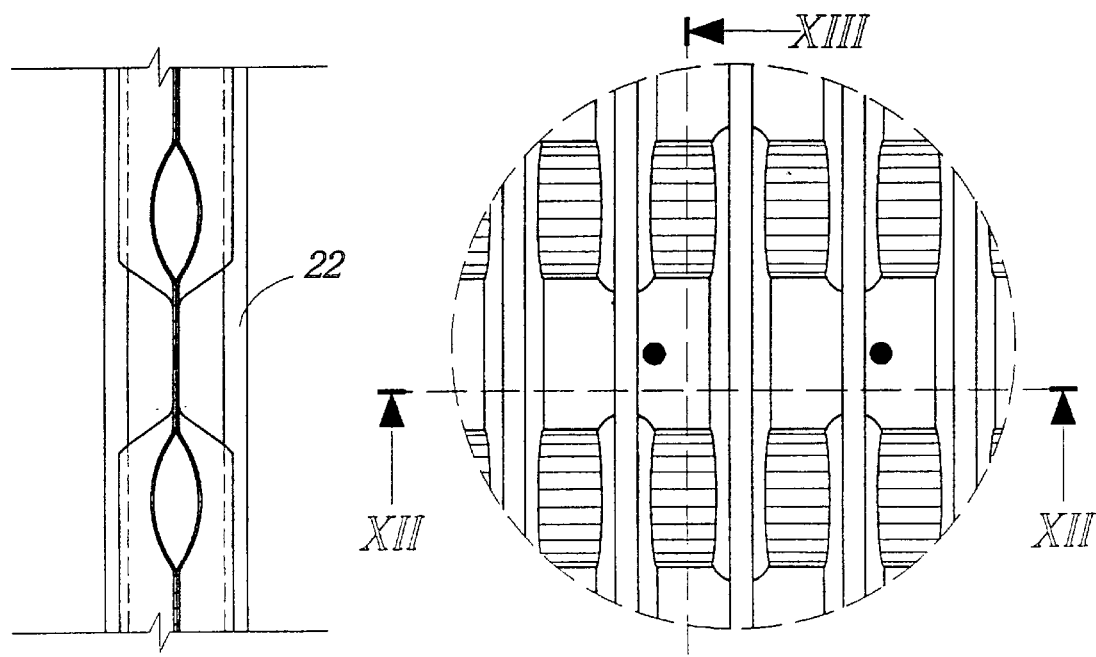
Fig. 13
Fig. 11

FILTER SECTOR

The present invention concerns a filter sector for a filter disk of a rotating filter, said filter disk comprising a plurality of such filter sectors. The filter sector includes two interconnected plate-shaped elements each having a main plane. Protrusions shaped in the material of the plate-shaped elements extend outwardly from the main plane and are adapted to keep a filter cloth at a distance from the respective main plane. The term 'main plane' used herein shall be understood as the plane of a blank for a plate shaped element in its original, unshaped, plane condition.

U.S. Pat. No. 5,330,644 discloses a filter sector of this general kind, where protrusions or bulbs extend also inwardly from the main planes of the plate-shaped elements and are adjoined at engaging contact surfaces located in a middle plane of the filter sector. Thus, the main planes of the two plate-shaped elements are spaced from the middle plane by the height of the inwardly directed bulbs. Thereby, a filter structure is created having great resistance to bending in all directions. Holes are provided in the main planes of the plate-shaped elements to direct filtrate into the interior space between the two plate-shaped elements. In operation of this filter sector, as well as other filter sectors where filtrate is directed into the interior of the filter sector, it has turned out that there is a tendency that the interior of the filter sector is gradually clogged by deposited fine particles brought along with the filtrate. Furthermore, cleaning and flushing the interior is impracticable.

It is a desire, thus, to create a new filter sector where there is no need to direct filtrate into the interior of the sector. (The need to direct filtrate into the interior of a filter sector once arose when such large filtrate volumes had to be withdrawn from a filter sector that could not be discharged by leading filtrate between the filter cloth and the surface of the plate-shaped elements only.) At the same time, the always existing problem of re-wetting will be solved. Still, such new filter sector shall-be resistant to compression and to bending in all directions.

According to the present invention, a filter sector for a filter disk of a rotating filter including two inter-connected plate-shaped elements formed from a sheet material having a relatively thin material thickness and each having a main plane corresponding to the plane of the sheet materiel in its unshaped condition, and protrusions shaped in the material of the plate-shaped elements extending outwardly from the respective main plane and being adapted to keep a filter cloth at a distance from the respective main plane, is characterized in that mutually spaced, substantially parallel ridges are shaped in the material of the plate-shaped elements and continuously extend in a first direction over the filter sector, that said protrusions discontinuously extend over the filter sector in a second direction substantially perpendicular to said first direction, each protrusion lengthwise spanning over at least two adjacent ridges, and laterally adjacent protrusions being lengthwise displaced in relation to each other by at least the spacing between adjacent ridges, and that said ridges have a height above the main plane less than said distance.

A second embodiment of the present invention provides for further increased resistance to bending around axes substantially perpendicular to the radial direction by being provided with tensional force transmitting means extending between respective radially innermost and radially outermost protrusions of at least some radial rows of protrusions and being attached to at least said innermost and outermost protrusions.

Two embodiments of the invention will be described hereinafter, reference being made to the accompanying drawings, wherein:

FIG. 1 is an elevational view of a filter sector according to a first embodiment of the present invention;

FIG. 2 is a side view thereof;

FIG. 3 is a bottom view thereof;

FIG. 11 is a cut out portion XI of FIG. 10 showed at an enlarged scale;

FIG. 12 is a section along line XII—XII of FIG. 11; and

FIG. 13 is a section along line XIII—XIII of FIG. 11.

Figure 7:
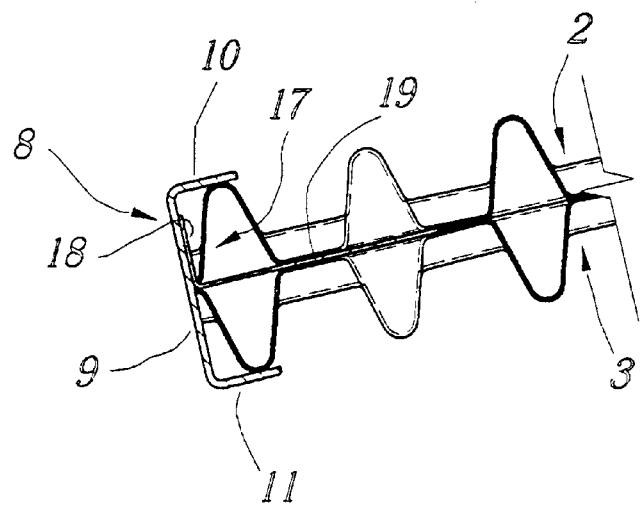
FIG. 7 is a section along line VII of FIG. 1.
Figure 10:
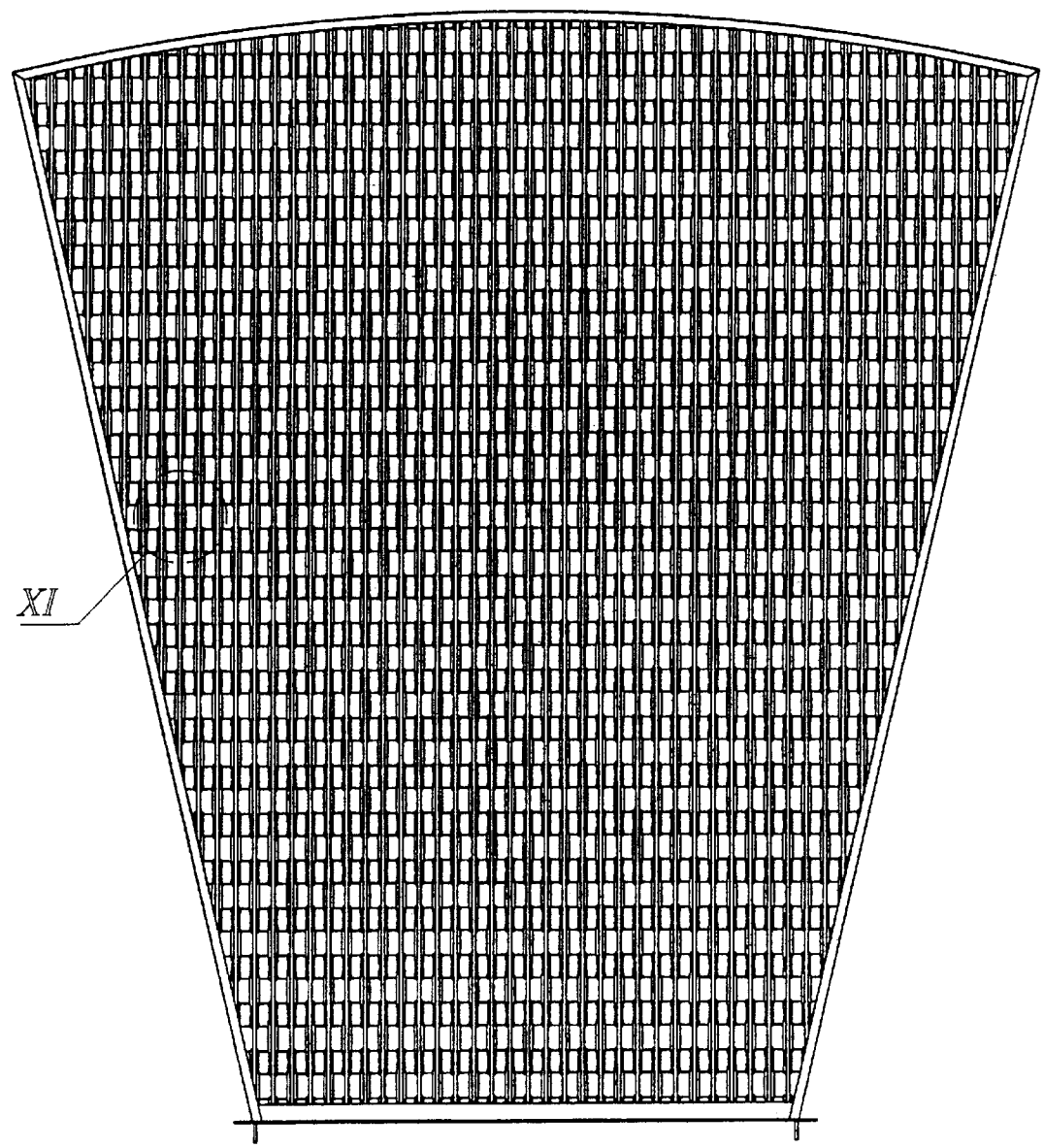
FIG. 10 is an elevational view of a filter sector according to a second embodiment of the present invention.

The filter sector 1 shown in FIGS. 1, 2 and 3 has the general shape of a truncated sector of a circle including two plate-shaped elements or panels 2 and 3 defined by a radially outer arcuate edge 4, two substantially radially extending straight side edges 5 and 6, and an inner straight edge 7 constituting the discharge end of the filter sector. The outer edge 4 and the side edges 5 and 6 are formed by substantially U-shaped sections 8 shown in more detail in FIG. 7 and having a web portion 9 and two flange portions 10 and 11 gripping around the panels 2 and 3. The inner edge is provided with suitable flanges 12 or the like for attachment of the filter sector to a rotatable hollow shaft or the like as is well known in the art.

Each panel 2 and 3, manufactured from an originally flat sheet-shaped blank of acid proof steel or any suitable synthetic resin, has planar portions defining a main plane 13 (on the drawings denominated 13:2 and 13:3, respectively, and corresponding to the planes of the respective blank), and protrusions 14 shaped in the material of the panel. The protrusions 14 extend outwardly from the respective main plane and are adapted to keep a non-shown filter cloth at a distance from the main plane. Each protrusion has sides 14a and 14b and an apex 14c.

According to the present invention, continuous, mutually spaced, substantially parallel ridges 15 extend cross-wise over the panels 2 and 3 between the side edges 5 and 6 thereof such that they are substantially perpendicular to a bisector of the filter sector which, of course, extends in a radial direction. Each ridge has sides 15a and 15b and an apex 15c.

The protrusions 14 extend in a direction substantially perpendicular to the direction of the ridges 15. According to the present invention, each protrusion 14 is spanning over two adjacent ridges 15 (as shown in this embodiment) or more, i.e. it has a length between its ends at least equal to the distance between sides 15a, 15b of adjacent ridges 15 turned away from each other.

Further, laterally adjacent protrusions 14 are lengthwise displaced in relation to each other. In the embodiment shown, such displacement is equal to the relative displacement of adjacent ridges.

The protrusions 14 have a greater height over the respective main plane 13 than the ridges 15 so as to keep a filter cloth clear of the ridges and provide sufficient area for flow of filtrate between a filter cloth and the ridges towards the outlet end of the filter sector at its edge 7. Due to the relative short length of the protrusions 14, they do not considerably interfere with filtrate flow towards the outlet end other than—in some rotational positions of the filter sector—forcing the filtrate to assume a more or less zigzag-like flow pattern.

The main planes 13:2, 13:3 of the two panels 2 and 3 are joined together by spot welds 16.

Figure 4:
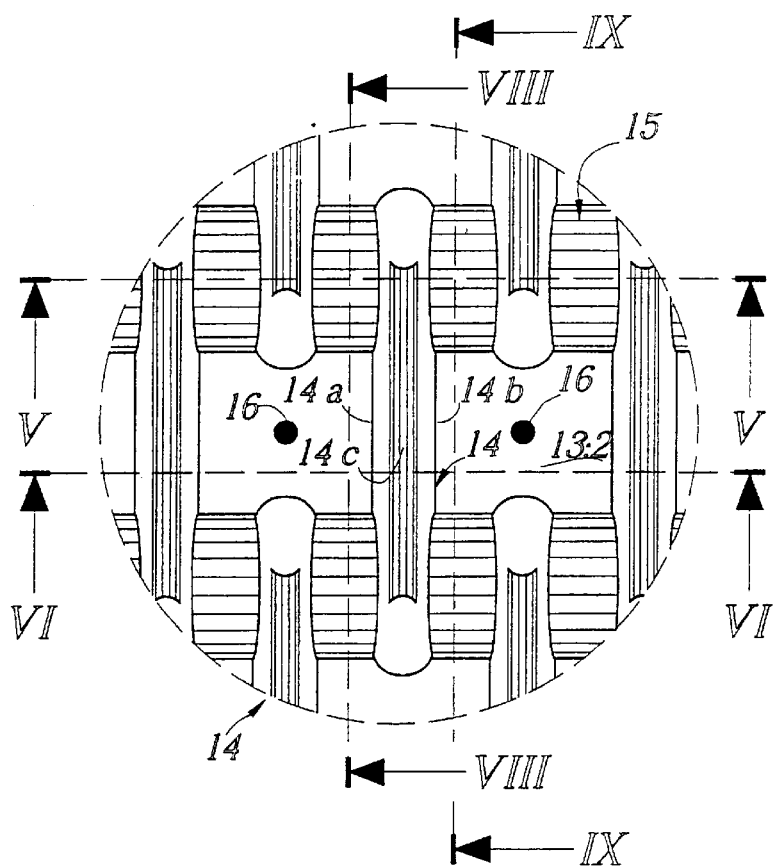
FIG. 4 is a cut out portion IV of FIG. 1 showed at an enlarged scale.
Figure 8:
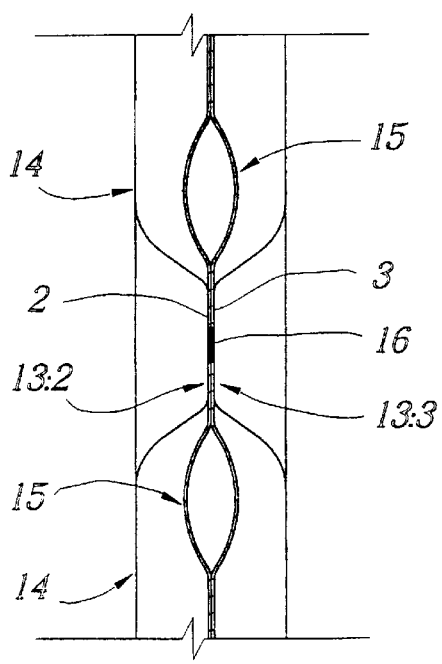
FIG. 8 is a section along line VIII—VIII of FIG. 4.
Figure 9:
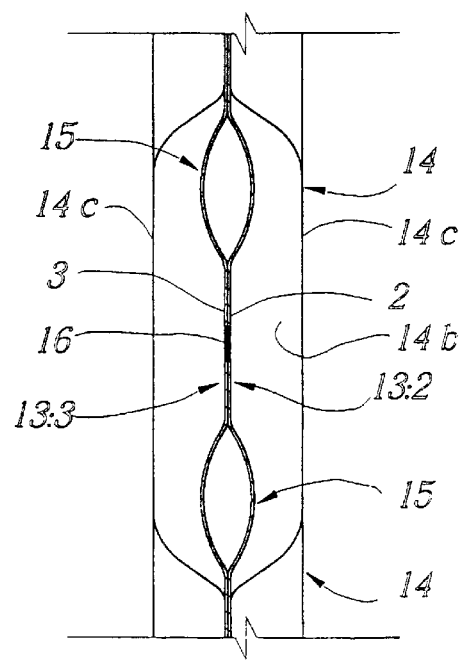
FIG. 9 is a section along line IX—IX of FIG. 4.
Figure 5:
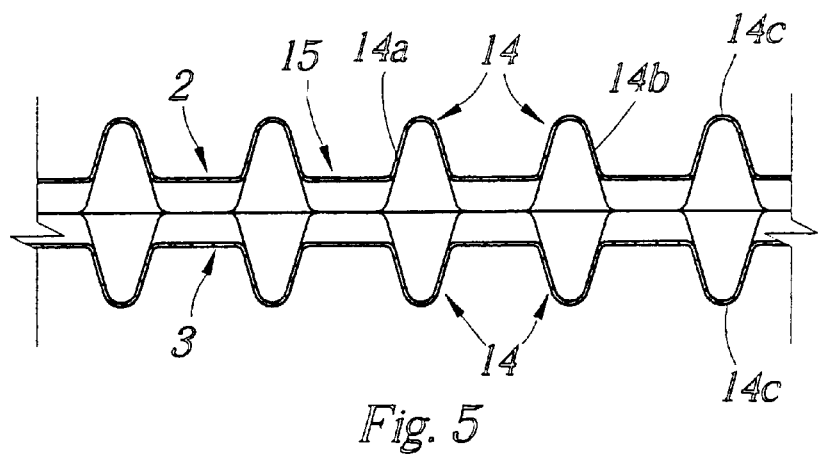
FIG. 5 is a section along line V—V of FIG. 4.
Figure 6:
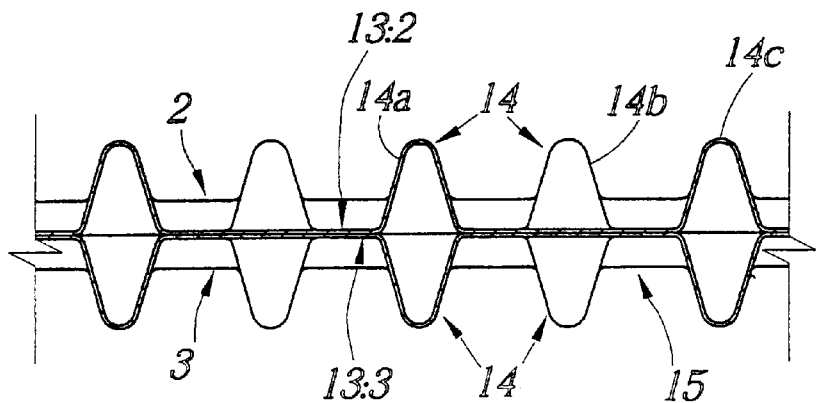
FIG. 6 is a section along line VI—VI of FIG. 4.

From the foregoing it is evident that the continuous ridges 15 provide for bending resistance in a first direction. According to the present invention, the protrusions 14, although not continuously extending over the filter sector, provide for bending resistance in a direction substantially perpendicular to the first direction by spanning or gripping over at least two adjacent ridges 15. Thus, by the lengthwise displacement between adjacent protrusions 14, there is created a kind of "chain-like" or zigzag continuity between adjacent protrusions 14. In other words, overlapping ends of adjacent protrusions 14 are inter-connected by being connected to a ridge 15 extending between them. In this context, it is to be observed that the protrusions 14 keep their full heights until they have passed over crossing ridges 15 (see FIG. 8).

The U-shaped sections 8 are suitably attached to the panels 2 and 3 by means of an L-section 17 (see FIG. 7) having legs 18 and 19, a shorter leg 18 being welded to the web portion 9 and a longer leg 19 being inserted between the main planes 13:2 and 13:3 of the panels 2 and 3, respectively, and welded thereto.

The second embodiment of the present invention shown in FIGS. 10–13 corresponds in all essential to the one previously described but is completed by having a plurality of bars 22 extending in substantially radial directions along at least some rows of protrusions 14'. The bars are in contact with the apices 14c' of the protrusions 14' and are attached to at least a radially innermost and a radially outermost protrusion 14' in order to further increase the bending resistance obtained by the overlapping relationship of the protrusions 14 described in connection with the first embodiment. In this second embodiment, the apex 14'c of each protrusion 14' of a row having a rod 22 is provided with a depression 23 accomodating at least a portion of the cross-section of the bar extending therealong (see FIG. 12).

It is preferred that a rod 22 extends along each substantially radial row of protrusions 14' and that each rod is attached to each protrusion 14' along which it extends. The rods are preferably made of acid-proof steel and are spot welded to the protrusion 14'.

Apart from providing increased bending resistance, improved support of a filter cloth is obtained in that the bars 22 continuously extend along the rows of protrusions 14', which is advantageous in filtering cases employing extreme vacuum.

I claim:

1. A filter sector for a filter disk of a rotating filter, said filter disk comprising a plurality of such filter sectors, said filter sector including two inter-connected plate-shaped elements (2,3) formed from a sheet material and each plate shaped-element having planar portions defining a main plane (13) protrusions (14) shaped in the material of the plate-shaped elements extending outwardly from the respective main plane and being adapted to keep a filter cloth at a distance from the respective main plane, characterized in that mutually spaced, substantially parallel ridges (15) are shaped in the material of the plate-shaped elements and continuously extend in a first direction over the filter sector, that said protrusions (14) discontinuously extend over the filter sector in a second direction substantially perpendicular to said first direction, each protrusion lengthwise spanning over at least two adjacent ridges (15), and laterally adjacent protrusions (14) being lengthwise displaced in relation to each other by at least a spacing between adjacent ridges (15), that said ridges (15) have a height above the main plane (13) less than said distance, and that the main planes of the plate-shaped elements are adjoined.

2. Filter sector according to claim 1, characterized in that said second direction is substantially radial with respect to a center of said disk.

3. Filter sector according to claim 1, characterized in that the lengthwise displacement between laterally adjacent protrusions (14) is equal to the spacing between of adjacent ridges (15).

4. Filter sector according to claim 2, characterized in that tensional force transmitting bars (22) extend between respective radially innermost and radially outermost protrusions (14') of at least one radial row of protrusions, is in contact with apices (14c') of all protrusions (14') of said at least one row and is attached to at least said innermost and outermost protrusions of a respective row.

5. Filter sector according to claim 4, characterized in that said bars (22) are attached to the apex (14'a) of each protrusion (14') along which it extends.

6. Filter sector according to claim 4, characterized in that the apex (14'a) of each protrusion (14') of a row of protrusions having one of said bars (22) extending therealong is provided with a depression (23) accomodating at least a portion of a cross-section of the respective bar.

7. Filter sector according to any claim 4, characterized in that one of said bars (22) extends along each substantially radial row of protrusions (14') and that each said bar is attached to each protrusion (14') along which it extends.

8. Filter sector according to claim 4, characterized in that the bars (22) are spot welded to the protrusions 14'.

* * * * *